United States Patent [19]

Berberich et al.

[11] Patent Number: 4,802,565
[45] Date of Patent: Feb. 7, 1989

[54] DEVICE FOR ADJUSTING A SET OF WORKPIECE MOUNTS IN DEFINED WORKING POSITIONS

[75] Inventors: Bernd Berberich, Schwieberdingen; Holger Reinhold, Freudenstadt, both of Fed. Rep. of Germany

[73] Assignee: Tampoflex GmbH, Ditzingen, Fed. Rep. of Germany

[21] Appl. No.: 174,607

[22] Filed: Mar. 29, 1988

[30] Foreign Application Priority Data

Mar. 30, 1987 [DE] Fed. Rep. of Germany ....... 3710534

[51] Int. Cl.$^4$ ............ B65G 21/20; B65G 43/00; B65G 35/08; B65G 23/00
[52] U.S. Cl. .................. 198/345; 198/465.2; 198/795; 198/832
[58] Field of Search .............. 198/345, 465.2, 795, 198/832, 835

[56] References Cited

U.S. PATENT DOCUMENTS

| | | | |
|---|---|---|---|
| 2,789,683 | 4/1957 | Stahl | 198/465.2 X |
| 3,858,707 | 1/1975 | Block et al. | 198/345 |
| 4,476,974 | 10/1984 | Bradbury | 198/832 |
| 4,624,358 | 11/1986 | Satou | 198/345 |

FOREIGN PATENT DOCUMENTS 2092923 8/1982 United Kingdom ............... 198/345

Primary Examiner—Andres Kashnikow
Assistant Examiner—Patrick N. Burkhart

[57] ABSTRACT

This invention concerns a device for continuous adjustment of a set of workpiece mounts from a number of such mounts in defined work positions whereby the workpiece mounts are arranged with a certain spacing on an endless conveyor device that moves in rotation by increments such that the spacing corresponds to the length of one increment of movement of the conveyor device. Through additional simple adjustment means, the effect is acheived that the set of workpiece mounts in the working position can be adjusted to spacing that differ from the length of one increment of conveyor movement. Then the ork positions thus set are always maintained again in revolution of the endless conveyor device.

16 Claims, 3 Drawing Sheets

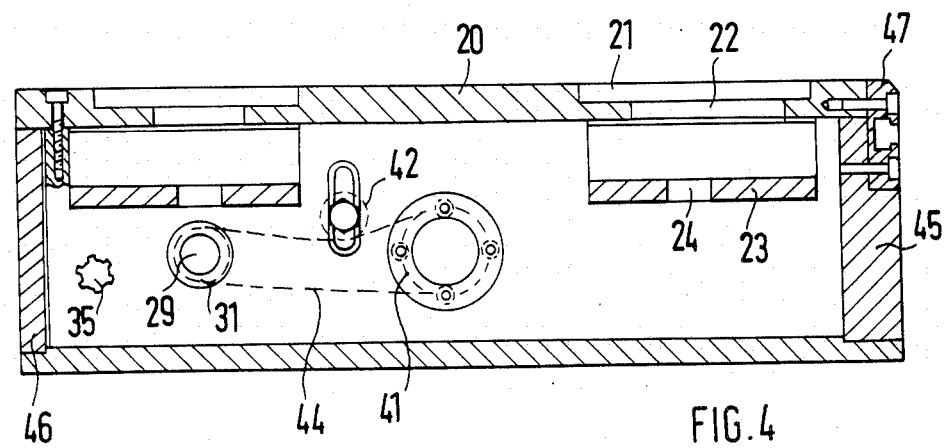
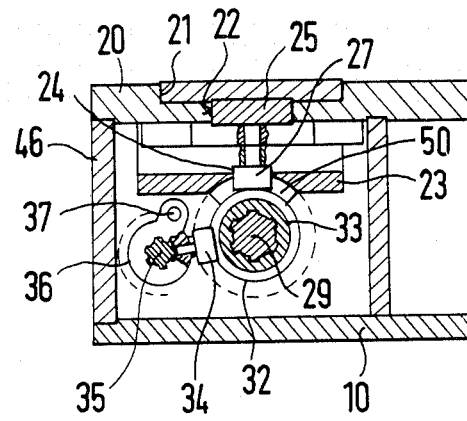

DEVICE FOR ADJUSTING A SET OF WORKPIECE MOUNTS IN DEFINED WORKING POSITIONS

FIELD OF THE INVENTION

This invention relates to devices for continuous movement to defined work positions of a set of workpiece mounts, where the workpiece mounts are arranged with a certain spacing on an endless conveyor device moving in increments and the spacing between workpiece mounts corresponds to the length of one increment of movement of the conveyor.

BACKGROUND OF THE INVENTION

Devices of this type are used, for example, with tampon printing machines, in order to be able to place four workpiece mounts under four tampons for four-color printing, so the print images are transferred from four differently-inked printing blocks to the workpiece secured on the workpiece mount. However, use of such devices is not limited to this application.

With such devices, the work positions for a set of workpiece mounts are predetermined and the spacing between work positions corresponds exactly to the length of one unit of incremental advance of the conveyor device. In practice, however, it has been found that problems arise with fixed work positions of the workpieces presented for processing, because the feeder belts often cannot maintain this spacing exactly. For example, with a multicolor tampon printing machine, the printing blocks in the printing block holders may deviate from the spacings due to environmental influences and other causes, and this leads to a poor print image.

OBJECT OF THE INVENTION

The object of this invention is to create a device of the type defined above in which the spacing of the work positions of the workpiece mounts can be varied within a given range in a simple manner, and this correction is carried out automatically for the set of workpiece mounts in the working positions at any time during the operation of the conveyor device.

BRIEF SUMMARY OF THE INVENTION

This problem is solved in accordance with this invention in the following manner: The workpiece mounts are conveyor sheds mounted on an endless conveyor device and pivotably connected to each other by means of elongated strips at intervals which correspond to the length of one increment of conveyor movement, with the sheds guided in a guide path in such a way that the pivot connections of the elongated strips to the sheds in the direction of movement of the conveying device have a degree of play. The conveyor sheds are insertable into a groove on a drive roll which can be set in rotational movement, more specifically, by means of guide rolls extending from the sheds in the area of the aforementioned pivot connections. The groove in the drive roll extends over at least one incremental length plus twice the diameter of the guide rolls, so that the guide rolls introduced into the drive roll and thus also the conveyor shed and the workpiece mounts can be brought to a defined reference position. The guide rolls of the conveyor sheds and workpiece mounts that complete the set are introduced into grooves on positioning rolls which are axially adjustable on a drive shaft which also carries the drive roll. The axial adjustment is by means of slide members having shift rolls which can be adjusted by threaded rods, but the positioning rolls are mounted on the drive shaft in a manner such that they cannot rotate thereon. The positioning rolls are adjustable therealong at intervals that deviate from the length of one incremental conveyor movement.

Conveyor devices formed with conveyor sheds can be moved in a loop without thereby forming separation joints between the conveyor sheds. In doing so, it is sufficient for the conveyor sheds to be guided in a guide path and pivotably connected to each other by elongated strips. The drive roll then assumes the function of stepwise or incremental movement of the conveyor sheds and the play in the pivot connections permits a change in the spacing of the conveyor sheds and thus the workpiece mounts.

The guide roll which is guided in the drive roll and is brought to the reference position determines the first working position of the respective conveyor shed. The remaining work positions are determined by the positioning rolls which hold the guide rolls of the other conveyor sheds, that is, the workpiece mounts of the set. With the help of shift rolls, these positioning rolls can be adjusted axially to a limited extent on the drive shaft of the drive roll so the spacings of the work positions can be adjusted individually. The shift rolls are carried by slide members which move axially on a carrier shaft but are held in such a way that they cannot rotate. The slide members are adjusted by means of threaded rods.

When the positioning rolls have been set in the proper work positions, the conveyor sheds and workpiece mounts which form a set at that moment are advanced continuously into the modified work positions. The spacings between the work positions may be somewhat larger or smaller than the length of one increment of movement of the conveyor device as determined by the drive roll and the drive of the drive shaft.

In one embodiment of this invention, the conveyor shed and the guide rolls are guided in such a way that the conveyor sheds are guided in a guide path of a cover plate which is formed on both sides by projections of the cover plate. The guide path has a slot through which a bearing section and the guide rolls project so that the guide rolls are guided in a slot in an intermediate plate. The elongated strips are mounted so they can pivot on the bearing sections of the guide rolls. The bearing sections of the guide rolls also assume the function as the rotational mount for the elongated strips.

The limited change in spacing between the conveyor sheds, which often amounts to just a few millimeters, is made possible by the fact that the holes in the elongated strips for receiving the bearing sections are elongated holes the width of which corresponds to the diameter of the bearing sections and the length of which corresponds to the diameter of the bearing sections plus a maximum equalization length or play.

In one embodiment, the transfer of the conveyor movement from the drive roll to the conveyor devices takes place in such a way that the drive roll groove has a width that corresponds to the diameter of the guide roll, and the drive roll imparts a conveyance movement to the guide roll which is guided in the holding groove. Such movement corresponds to one length of incremental advance with one revolution of the drive shaft, using an elongated helical holding groove.

The drive roll rotation means includes a first sprocket non-rotatably affixed to the drive shaft and set in rotational movement by a motor acting through a planetary gear system linked to a second or driving sprocket and a chain extending between the sprockets.

The axial adjustment and nonrotational mounting of the positioning rolls on the drive shaft are accomplished by the providing the drive shaft with longitudinal grooves. The positioning rolls have springs distributed in their bearing boreholes for engagement in the longitudinal grooves of the drive shaft.

The design of the positioning rolls is simplified by providing the positioning rolls with a peripheral groove bordered by side walls having a spacing (width) in the outer area corresponding to the diameter of the guide rolls and a spacing (width) in the base area corresponding to the diameter of the shift rolls. The side walls of the groove have an insertion opening for the guide rolls in the outer area. The shift rolls are offset with respect to the guide rolls and are held in the base area of the grooves of the positioning rolls.

The arriving guide roll enters the groove of the positioning roll through the insertion opening and the positioning roll holds the guide roll in the respective working position during the rotational movement of the drive shaft. In the area of the base of the groove, the shift roll is guided in the groove and is offset relative to the guide roll in such a way that the guide roll assigned to one working position and the corresponding shift roll do not interfere with each other.

The axial adjustment of the shift roll and the positioning roll which is engaged with it is achieved by virtue of the fact that the shift rolls are mounted on slide members which are guided on carrier shafts in a way such that they cannot twist but are axially adjustable. The adjustment takes place by means of threaded rods that are screwed into threaded receiving holes on the slide members.

The design of the conveyor sheds is similar to that of conveyor belts for baggage items and the like, in that they have matching convex and concave arcs on their adjacent sides, such that they fit together without a joint and can be twisted relative to each other.

BRIEF DESCRIPTION OF THE DRAWINGS

The invention will now be described in greater detail by reference to a practical embodiment illustrated in the drawing, in which:

FIG. 4 is a fragmentary view of the transverse side wall in which the drive shaft and carrier shaft are mounted; and FIG. 5 is a fragmentary sectional view taken along section V—V as indicated in FIG. 1, illustrating the devices for adjusting a positioning roll.

DETAILED DESCRIPTION OF PREFERRED EMBODIMENT

Figure 1:
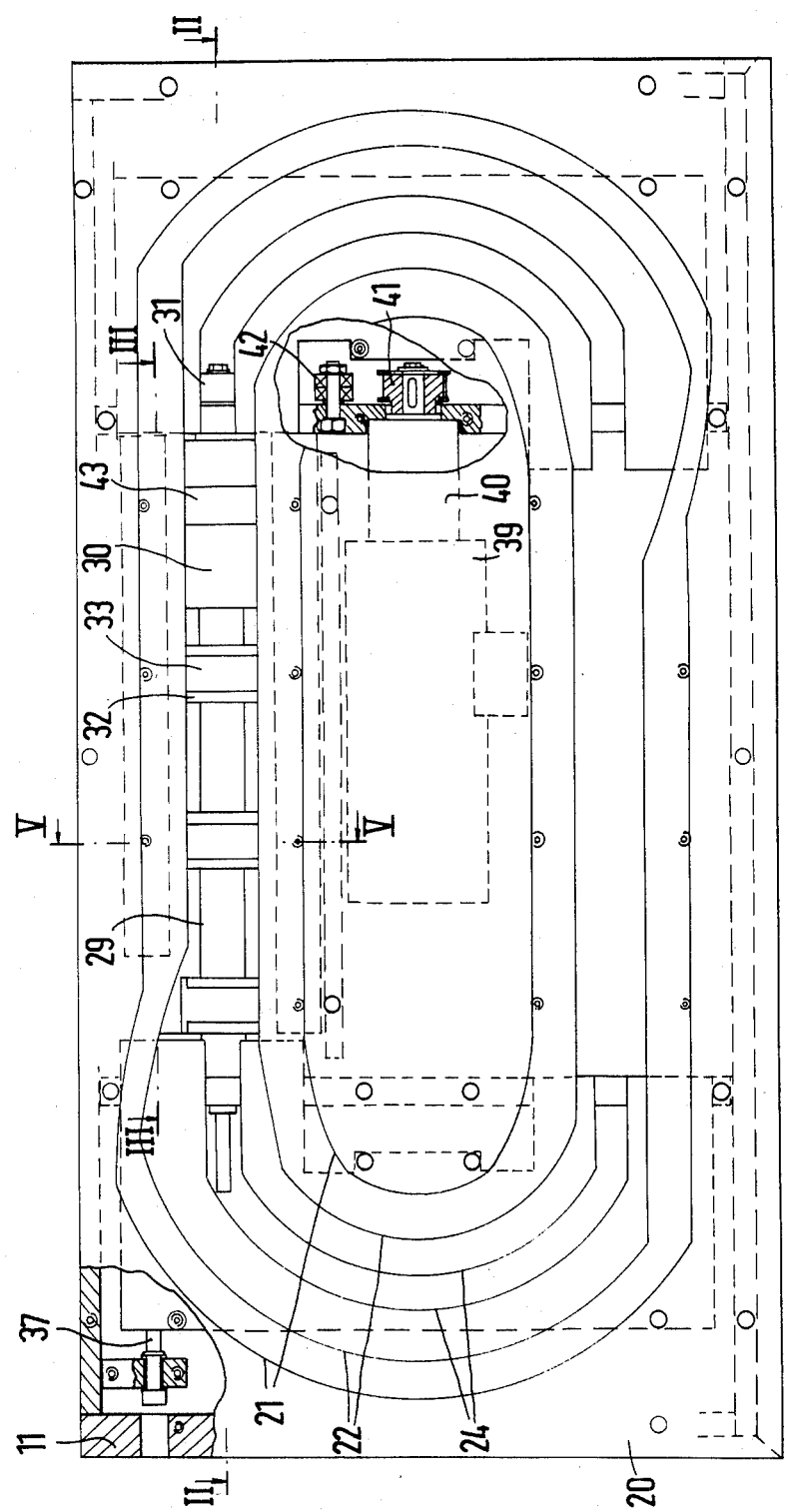
FIG. 1 is a top plan view of this embodiment.
Figure 2:
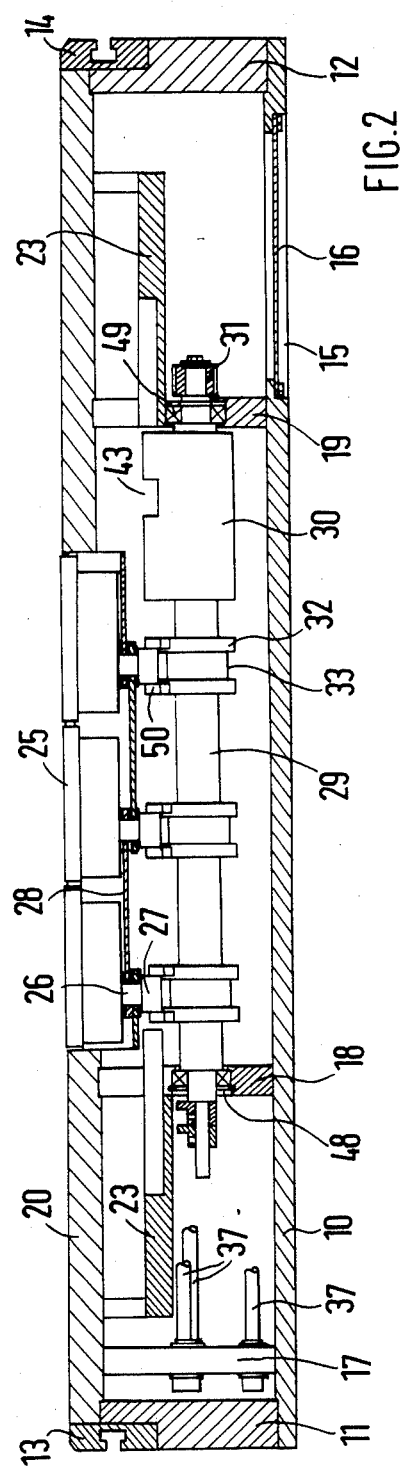
FIG. 2 is a sectional view taken along section II—II as indicated in FIG. 1.

The top of the device is covered by cover plate 20 as shown in FIG. 1. Base plate 10 and side walls 11, 12, 45 and 46 complete the outer enclosure of the device. Grooved strips 13, 14 and 47 are mounted on the upper front edge and the side edges abutting with it, offering the possibility for attaching external accessory parts.

Base plate 10 has an opening 15 which can be closed by means of a closing cover 16. Opening 15 provides access to a chain 44 which connects a sprocket 31 on drive shaft 29 to a drive sprocket 41. Chain 44 can be tightened by an adjustable tension roll 42. Drive sprocket 41 is driven through a planetary gear 40 by a motor 39, which is an electric motor as shown in FIGS. 1 and 4.

By means of projections on both sides of a passage 22, a guide path 21 is formed in cover plate 20 and is completed with a passage 24 in an intermediate plate 23 which is provided beneath cover plate 20. Conveyor sheds 25 are guided in guide path 21 and passage 22. Guide path 21 forms a loop, so transport sheds 25 are designed with concave and convex curvatures on the facing sides (ends) that fit together so they can be twisted relative to each other. Bearing sections 26 are mounted on the lower side of the conveyor sheds 25 and elongated strips 28 are mounted on these bearing sections in such a way that they may pivot. Bearing sections 26 are sealed with rotating guide rolls 27. The mounting means for bearing sections 26 are designed in elongated strips 28 as elongated holes which allow a limited shifting of the guide pins of adjacent conveyor sheds 25. As FIG. 1 shows, guide rolls 27 are guided in the deflection areas in passage 24 of intermediate plates 23. The workpiece mounts that hold the workpieces which are to be processed are mounted on conveyor sheds 25. Conveyor sheds 25 form an endless horizontal conveyor loop. The loop of conveyor sheds 25 may also be set up to run vertically.

The drive of conveyor sheds 25 is by means of drive roll 30 which sits tightly on drive shaft 29. Drive roll 30 has a mounting groove 43 into which guide rolls 27 of conveyor sheds 25 are inserted. Mounting groove 43 is helical in shape and extends in the direction of conveyance for a distance at least equal to the length of one incremental unit of advance, that is, the distance between conveyor sheds 25 plus twice the diameter of guide rolls 27.

It is simplest for drive rolls 30 to rotate once per incremental step of the conveyor so the drive can be controlled by means of a simple limit switch. This also assures that one conveyor roll 27 will always be engaged with mounting groove 43 of drive roll 30 and conveyor sheds 25 will be advanced again by one incremental length in the direction of conveyance with the next revolution of the drive shaft. The incremental length corresponds to the distance between the pivot connections of elongated strips 28 and also between rolls 27.

When drive shaft 30 is stationary, the guide roll 27 which is guided in mounting groove 43 and the respective conveyor shed 25, with its workpiece mount, is in a fixed reference position. If three other workpiece mounts belong to one set, then there will be three positioning rolls 32 on drive shaft 29, mounted as shown in FIG. 5 non-rotatably but axially shiftable on drive shaft 29. Positioning rolls 32 have a peripheral groove 33 with an insertion opening 50 through which guide rolls 27 enter grooves 33. With a rotational movement of drive shaft 29, the engagement of the side walls of groove 33 with the guide roll outer areas determines the working position of the corresponding guide roll 27 of conveyor shed 25 and its workpiece mount. Drive shaft 29 has elongated grooves with which springs distributed in their bearing boreholes of positioning rolls 32 are engaged. Ball bearings 48 and 49 support the drive shaft 29 in dividing walls 18 and 19.

Figure 3:
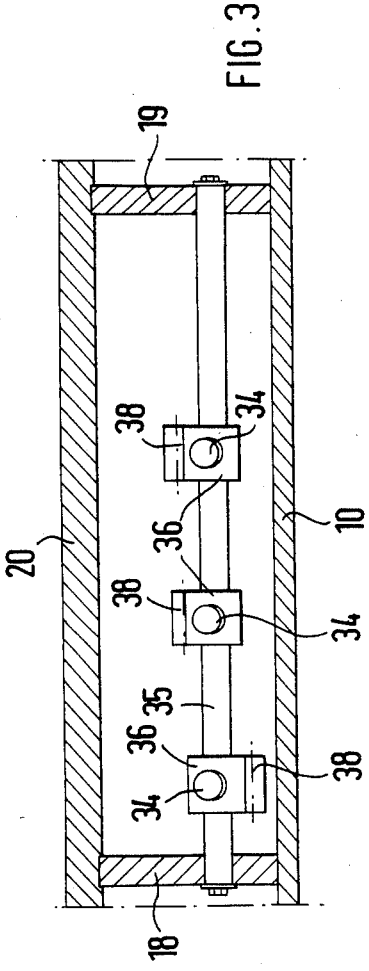
FIG. 3 is a fragmentary sectional view taken along section III—III as indicated in FIG. 1.

As shown in FIGS. 3 and 5, three slide members 36 are mounted on a carrier shaft 35 such that they cannot rotate thereon but are axially shiftable thereon. Carrier shaft 35 is secured so it cannot rotate in dividing walls 18 and 19. Each slide member 36 carries a rotatable shift roll 34 which is inserted into the area of the base of groove 33 of the respective positioning roll 32 but is offset with respect to guide roll 27 in groove 33. Three threaded rods 37 which are screwed into threaded mounting holes 38 of slide members 36 are mounted in a dividing wall 17.

Limited axial adjustment of slide members 36 on carrier shaft 35 is possible with threaded rods 37, which can be operated by access through side walls 11. Positioning rolls 32 are also adjusted by means of shift rolls 34 which are within grooves 33 of positioning rolls 32. The play in the pivot joints of elongated strips 28 limits the adjustability of positioning rolls 32 and thus also of slide members 36. In this way it is possible to adjust guide rolls 27, of the three successive guide rolls 27, to spacings which deviate from the incremental length of conveyor movement based on the guide roll 27 in the reference position on drive roll 30. It is possible in this way to set a positive or negative deviation. If the conveying devices are to be advanced by one increment, then guide roll 27 adjacent to drive roll 30 enters mounting groove 43 and another guide roll 27 completes the set of four guide rolls 27 which are in working position.

What was said for guide rolls 27 also applies to the respective conveyor sheds 25 with their workpiece mounts. Therefore, the set spacings which can be adjusted to the given conditions of the feed mechanism are always established in passage of the conveyor devices in the work positions.

We claim:

1. In a device for moving a set of workpiece mounts to work positions of the type with mounts arranged in a given spacing on an endless conveyor moving incrementally around a loop, the spacing corresponding to the length of one incremental movement, the improvement comprising:
   a frame;
   the mounts being sheds (25) on the frame pivotably connected to each other by elongated strips (28) at spacings corresponding to one incremental movement and which are guided in a guide path (21, 22, 24);
   the strip-shed connections having a given play in them in the direction of conveyor movement;
   a guide roll (27) connected to each shed in position adjacent to said pivot connections;
   a drive shaft (29);
   a rotating drive roll (30) on the drive shaft (29) having a groove (43) therein, the guide rolls (27) insertable into the groove (43), said groove (43) extending at least the length of one incremental conveyor movement plus twice the diameter of the guide rolls (27), whereby the shed (25) having its guide roll (27) inserted into the groove (43) can be brought to a defined reference position;
   positioning rolls (32) non-rotatably mounted on the drive shaft (29) and having peripheral grooves (33) receiving the guide rolls (27) of the sheds (25) which complete the set of workpiece mounts;
   slide members (36) adjustably mounted with respect to the frame and having shift rolls (34) engaged in one of the peripheral grooves (33);
   threaded rods (37) rotatably secured to the frame and each extending to one of the slide members (36) for adjustment thereof, the positioning rolls (32) adjustable on the drive shaft (29), by adjustment of the slide members (36), to spacings deviating from the length of incremental conveyor movement.

2. The device of claim 1 further comprising:
   the conveyor sheds each having a bearing section (26) extending therefrom, the guide rolls (27) extending below said bearing sections;
   a cover plate (20) connected to the frame;
   projections on the cover plate forming a guide path (21) therein in which the conveyor sheds are guided, the guide path (21) having a passage (22) through which bearing sections (26) and guide rolls (27) project;
   an intermediate plate (23) below the cover plate (20) and forming therein a passage (24) extending parallel to the guide path (21), the guide rolls (27) guided in the passage (24); and
   said elongated strips (28) pivotably mounted on the bearing sections (26).

3. The device of claim 2 wherein the elongated strips (28) have elongated holes receiving the bearing sections (26), said elongated holes having widths corresponding to the diameter of the bearing sections (26) and lengths corresponding to the diameter of the bearing sections (26) plus an equalization length.

4. The device of claim 1 wherein:
   the groove (43) of the drive roll (30) has a width corresponding to the diameter of the guide rolls (27); and
   the groove (43) is an elongated helical groove positioned and arranged such that one revolution of the drive shaft (29) the drive roll (30) provides conveyor movement corresponding to one incremental length.

5. The device of claim 1 having means to drive the drive roll (30) comprising:
   a first sprocket (31) secured to the drive roll (30); and
   a motor (39);
   a second sprocket (41) driven by the motor through a planetary gear (40); and
   a drive chain (44) between the first and second sprockets.

6. The device of claim 1 wherein the drive shaft (29) has longitudinal grooves therealong and the positioning rolls (32) have springs distributed in their bearing bore which engage the longitudinal grooves.

7. The device of claim 1 wherein: the positioning rolls (32) have a peripheral groove bounded by side walls, the groove having an upper-area width corresponding to the diameter of the guide rolls (27) and a base-area width corresponding to the diameter of the shift rolls (34);
   the side walls of the groove (33) have an insertion opening (50) for the guide rolls (27); and
   the shift rolls (34) are offset with respect to the guide rolls (27) around the grooves (33).

8. The device of claim 7 further including carrier shafts (35) extending from the frame, the slide members (36) being mounted thereon whereby they cannot twist, the slide members being axially adjustable along their carrier shafts (35) by means of said threaded rods (37), said rods being screwed into threaded holes (38) of the slide members (36).

9. The device of claim 1 wherein the conveyor sheds (25) have convex and concave curvatures on their adjacent sides such that they fit together without a seam and can be twisted relative to each other as they proceed along the conveyor.

10. The device of claim 9 further comprising:
the conveyor sheds each having a bearing section (26) extending therefrom, the guide rolls (27) extending below said bearing sections;
a cover plate (20) connected to the frame;
projections on the cover plate forming a guide path (21) therein in which the conveyor sheds are guided, the guide path (21) having a passage (22) through which bearing sections (26) and guide rolls (27) project;
an intermediate plate (23) below the cover plate (20) and forming therein a passage (24) extending parallel to the guide path (21), the guide rolls (27) guided in the passage (24); and
said elongated strips (28) pivotably mounted on the bearing sections (26).

11. The device of claim 10 wherein the elongated strips (28) have elongated holes receiving the bearing sections (26), said elongated holes having widths corresponding to the diameter of the bearing sections (26) and lengths corresponding to the diameter of the bearing sections (26) plus an equalization length.

12. The device of claim 11 wherein:
the groove (43) of the drive roll (30) has a width corresponding to the diameter of the guide rolls (27); and
the groove (43) is an elongated helical groove positioned and arranged such that one revolution of the drive shaft (29) the drive roll (30) provides conveyor movement corresponding to one incremental length.

13. The device of claim 12 having means to drive the drive roll (30) comprising:
a first sprocket (31) secured to the drive roll (30); and
a motor (39);
a second sprocket (41) driven by the motor through a planetary gear (40); and
a drive chain (44) between the first and second sprockets.

14. The device of claim 13 wherein the drive shaft (29) has longitudinal grooves therealong and the positioning rolls (32) have springs distributed in their bearing bore which engage the longitudinal grooves.

15. The device of claim 14 wherein:
the positioning rolls (32) have a peripheral groove bounded by side walls, the groove having an upper area width corresponding to the diameter of the guide rolls (27) and a base-area width corresponding to the diameter of the shift rolls (34);
the side walls of the groove (33) have an insertion opening (50) for the guide rolls (27); and
the shift rolls (34) are offset with respect to the guide rolls (27) around the grooves (33).

16. The device of claim 15 further including carrier shafts (35) extending from the frame, the slide members (36) being mounted thereon whereby they cannot twist, the slide members being axially adjustable along their carrier shafts (35) by means of said threaded rods (37), said rods being screwed into threaded holes (38) of the slide members (36).

* * * * *

UNITED STATES PATENT AND TRADEMARK OFFICE
CERTIFICATE OF CORRECTION

PATENT NO. : 4,802,565

DATED : February 7, 1989

INVENTOR(S) : Bernd Berberich & Holger Reinhold

It is certified that error appears in the above-identified patent and that said Letters Patent is hereby corrected as shown below:

In the Abstract, line 12, change "ork" to --work--.

In col. 3, line 8, change "by the" to --by--.

In claim 4, line 6, after "that" insert --with--.

In claim 7, the portion following immediately after the ":" and extending to the next ";" should appear as a separate subparagraph.

In claim 12, line 6, after "that" insert --with--.

Signed and Sealed this

Twentieth Day of June, 1989

Attest:

DONALD J. QUIGG

Attesting Officer

Commissioner of Patents and Trademarks